US012545609B2

(12) United States Patent
O'Loughlin et al.

(10) Patent No.: US 12,545,609 B2
(45) Date of Patent: Feb. 10, 2026

(54) AERATOR

(71) Applicant: PATRICK CHARLES PTY LTD, Belrose (AU)

(72) Inventors: John Patrick O'Loughlin, Belrose (AU); John Charles Rasmus, Belrose (AU)

(73) Assignee: PATRICK CHARLES PTY LTD, Belrose (AU)

( * ) Notice: Subject to any disclaimer, the term of this patent is extended or adjusted under 35 U.S.C. 154(b) by 925 days.

(21) Appl. No.: 17/773,724

(22) PCT Filed: Nov. 3, 2020

(86) PCT No.: PCT/AU2020/051194
§ 371 (c)(1),
(2) Date: May 2, 2022

(87) PCT Pub. No.: WO2021/087556
PCT Pub. Date: May 14, 2021

(65) Prior Publication Data
US 2022/0371931 A1 Nov. 24, 2022

(30) Foreign Application Priority Data

Nov. 6, 2019 (AU) ................................ 2019904176

(51) Int. Cl.
*C02F 7/00* (2006.01)
*B01F 23/23* (2022.01)
(Continued)

(52) U.S. Cl.
CPC .......... *C02F 7/00* (2013.01); *B01F 23/23231* (2022.01); *B01F 23/237611* (2022.01);
(Continued)

(58) Field of Classification Search
CPC ........ C02F 7/00; C02F 3/18; B01F 23/23231; B01F 25/31242; B01F 35/7175;
(Continued)

(56) References Cited

U.S. PATENT DOCUMENTS 4,290,885 A * 9/1981 Kwak ..................... C02F 3/207
210/197
5,846,106 A * 12/1998 Kumita ................ B63H 21/305
248/638
(Continued)

FOREIGN PATENT DOCUMENTS

CN 204874048 U 12/2015
CN 206529359 U 9/2017
(Continued)

OTHER PUBLICATIONS

JPH11-57768 A_English translation (Year: 1999).*
International Search Report & Written Opinion dated Jan. 22, 2021 from corresponding PCT Application No. PCT/AU2020/051194.

Primary Examiner — Youngsul Jeong
(74) Attorney, Agent, or Firm — INNOVATION CAPITAL LAW GROUP, LLP; Vic Lin

(57) ABSTRACT

An aerator has a submersible mixing tube having a water inlet and an aerated water outlet. An aspirating tube penetrates the mixing tube between the water inlet and the aerated water outlet, the aspirating tube having an air outlet introducing air into the mixing tube and an air inlet drawing in air from atmosphere above a water surface. The mixing tube has an outboard motor lower unit engagement to engage a lower unit of an outboard motor in use such that a propeller thereof locates entirely within the mixing tube with a midsection of the outboard motor extending from the engagement. As such, the propeller of the outboard motor lower unit thrusts water past the air inlet thereby creating (Continued)

suction at the inlet to draw air via the mixing tube to mix with the water to expel a plume of aerated water.

24 Claims, 1 Drawing Sheet

(51) Int. Cl.
  *B01F 23/232* (2022.01)
  *B01F 23/237* (2022.01)
  *B01F 25/31* (2022.01)
  *B01F 25/312* (2022.01)
  *B01F 35/71* (2022.01)
  *C02F 3/18* (2023.01)
  *B01F 101/00* (2022.01)

(52) U.S. Cl.
  CPC .... *B01F 25/31242* (2022.01); *B01F 35/7175* (2022.01); *C02F 3/18* (2013.01); *B01F 2101/305* (2022.01); *B01F 2215/0422* (2013.01)

(58) Field of Classification Search
  CPC ........ B01F 23/237611; B01F 2101/305; B01F 2215/0422
  See application file for complete search history.

(56) References Cited

U.S. PATENT DOCUMENTS

| | | | | |
|---|---|---|---|---|
| 7,713,413 B2 * | 5/2010 | Barnes | ................... | C02F 3/302 |
| | | | | 210/906 |
| 9,902,633 B2 * | 2/2018 | Reilly | ..................... | C02F 3/006 |
| 2011/0263168 A1 | 10/2011 | Adams | | |

FOREIGN PATENT DOCUMENTS

| | | | | |
|---|---|---|---|---|
| JP | S5477563 A | | 6/1979 | |
| JP | H11-57768 A | * | 3/1999 | ................ C02F 3/26 |
| JP | 2004188260 A | | 7/2004 | |
| JP | 2011167764 A | | 9/2011 | |
| KR | 20160127527 A | | 11/2016 | |

* cited by examiner

AERATOR

FIELD OF THE INVENTION

This invention relates generally to an improved aerator and, more particularly, to an aerator having a submersible mixing tube which is configured for connection to a conventional outboard motor for low-cost manufacture and ad hoc deployment.

BACKGROUND OF THE INVENTION

Aeration may be required in water bodies having hypoxic or anoxic conditions and which is achieved by the infusion of air by surface agitation to allow for oxygen exchange at the surface of the water body. Dissolved oxygen is a main contributor to water quality and not only is dissolved oxygen required by fish and most other aquatic animals, dissolved oxygen may assist aerobic bacteria decompose organic matter. When dissolved oxygen concentrations become too low, anoxic conditions may develop which can decrease the ability of the water body to support life.

May types of aeration methods exist which generally comprise surface aeration or subsurface aeration and there are a number of techniques and technologies available for both approaches. Subsurface aeration may comprise jet aeration using jet aerators which aspirate air, typically by exploiting the Venturi effect. Other subsurface aeration techniques may use coarse or fine bubble diffusers.

Surface aeration techniques may employ fountains or floating surface aerators.

Aerators of whichever type however are generally expensive to build, install and maintain. For example, surface aerators may comprise electric motors affixed from floating barges or weirs which are costly to manufacture and install. Furthermore, the electric motors require onshore power source electrification.

These types of aerators are not especially suited for low-cost ad hoc applications wherein aeration may be required quickly, temporarily and at low cost.

The present invention seeks to provide a way, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein an aerator comprises a submersible mixing tube having a water inlet and an aerated water outlet. An aspirating tube penetrates the mixing tube between the water inlet and the aerated water outlet. The aspirating tube has an air outlet introducing air into the mixing tube and an air inlet drawing in air from atmosphere above the water surface.

The mixing tube comprises an outboard motor lower unit engagement to engage a lower unit of an outboard motor within the mixing tube such that a propeller thereof can turn within the mixing tube. The midsection of the outboard motor extends out from the engagement to an above surface power head of the outboard motor.

As such, in use, the propeller of the outboard motor lower unit thrusts water past the air inlet creating suction to draw air via the aspirating tube to mix with the water to expel a plume of aerated water via the aerated water outlet.

The present aerator is of simple construction and can therefore be manufactured at low cost. The mixing tube can also be transported at low cost relatively easily and installed onto generally any available outboard motor including one affixed to a boat for temporarily or periodically aerating a body of water. The present aerator does not require costly installation as like the prior art aerators described above and furthermore does not require onshore electrical power installations.

The outboard motor lower unit engagement may be configured for accommodating various types of outboard motors. The outboard motor lower unit engagement may comprise a channel which extends to an edge of the mixing tube such that the lower unit can slide therein from an end of the mixing tube and such that the channel can be narrower than the diameter of the propeller. Furthermore, lateral gaskets may seal edges of the channel against the outboard motor lower unit thereby reducing or eliminating water flow via the channel.

In preferred embodiments, the aspirating tube is slidably engaged within a sliding engagement such that the position of the air outlet thereof may be controlled to find a position of maximum flow to maximise aeration. As such, the air outlet may be positioned away from a propeller centrepoint "dead zone". Furthermore, the position of maximum flow rate may depend on the type of outboard motor and propeller configuration.

In a further preferred embodiment, the outboard motor lower unit engagement allows for the longitudinal positioning adjustment of the lower unit of the mixing tube. In embodiments, the channel may be longer than the lower unit or conventional lower units and may comprise fore an aft fixing brackets which fix against fore and aft edges of the lower unit. As such, the lower unit may be fixed in position to control the position of the lower unit with respect to the mixing tube. As such, the position of the air outlet may be optimised with respect to the position of the propeller so as to avoid or reduce unwanted cavitation. This way, the air outlet may be positioned sufficiently close to the propeller so as to experience higher flow rate and turbulence at this closer position yet while being sufficiently far away from the propeller to avoid or reduce likelihood of cavitation.

The aerator may comprise a screened inlet guide of increasing diameter to draw in water at a low flow rate to protect aquatic life and avoid debris. The aerator may comprise an outlet guide to direct the plume of aerated water downwardly to increase aeration at a lower depths.

According to one aspect, there is provided an aerator comprising a submersible mixing tube having a water inlet and an aerated water outlet, an aspirating tube penetrating the mixing tube between the water inlet and the aerated water outlet, the aspirating tube having an air outlet introducing air into the mixing tube and an air inlet drawing in air from atmosphere above a water surface and wherein the mixing tube comprises an outboard motor lower unit engagement to engage a lower unit of an outboard motor in use such that a propeller thereof locates entirely within the mixing tube with a midsection of the outboard motor extending from the engagement such that, in use, the propeller of the outboard motor lower unit thrusts water past the air inlet thereby creating suction at the inlet to draw air via the mixing tube to mix with the water to expel a plume of aerated water.

The air outlet may be located between the outboard motor lower unit engagement and the aerated water outlet.

The aspirating tube may be angled with respect to an elongate axis of the mixing tube.

The aspirating tube may be angled at approximately 45° with respect to the elongate axis.

The aspirating tube may be angled to one side of the mixing tube.

The aspirating tube may be slidably engaged within a sliding engagement such that the position of the air outlet thereof can be adjusted with respect to the mixing tube.

The sliding engagement may comprise a block within aperture therein through which the aspirating tube may be slidably retained.

The aerator may further comprise a support arm supporting an upper end of the aspirating tube.

The support arm may be parallel with the aspirating tube and holds a collar at the upper end of the aspirating tube within which the aspirating tube may be slidably retained.

The outboard motor lower unit engagement may be configured such that, in use, the longitudinal position of the outboard motor lower unit with respect to the mixing tube can be adjusted.

The motor lower unit engagement may comprise a longitudinal channel within which the lower unit may be positioned at differing locations therealong.

The aerator may further comprise fore and aft fixing brackets which engage fore and aft edges of the outboard motor lower unit at a position along the channel.

The channel may extend through an end of the mixing tube.

The aerator may further comprise opposing longitudinal gaskets along the channel which close against adjacent edges of the outboard motor lower unit in use.

The aerator may further comprise an inlet guide of increasing diameter with respect to the diameter of the mixing tube.

The inlet guide may comprise a frustoconical section.

The inlet guide may comprise a screen at an entrance thereof.

The inlet guide may comprise an engagement collar for fixing to an adjacent end of the mixing tube.

The aerator may further comprise an angled outlet guide at the aerated water outlet.

The angled outlet guide may comprise an engagement collar for fixing to an adjacent end of the mixing tube.

According to another aspect, there is provided a method of aeration comprising the aerator as described herein, the method comprising inserting an outboard motor lower unit into the mixing tube such that the propeller thereof locates within the mixing tube and powering the outboard motor to thrust water past the air inlet of the aspirating tube to aerate water.

The method may comprise sliding the aspirating tube within the sliding engagement to optimise the position of the air outlet.

The method may comprise sliding the outboard motor lower unit within the sliding engagement to optimise the position of the outboard motor lower unit.

Optimising the position of the outboard motor lower unit may comprise positioning the outboard motor lower unit away from the air outlet to reduce or eliminate cavitation.

Inserting the outboard motor lower unit may comprise sliding the lower unit via the edge of the mixing tube into the channel.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
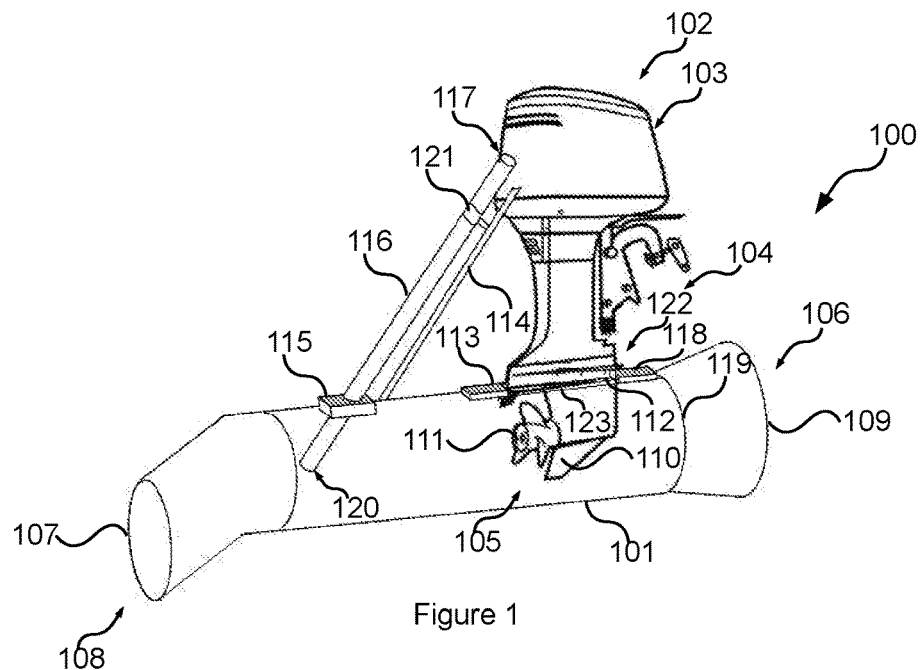
FIG. 1 shows an aerator engaging an outboard motor in accordance with an embodiment.

An aerator 100 comprises a submersible mixing tube 101 having a water inlet 106 and an aerated water outlet 108. The submersible mixing tube 101 may be made from hardened plastic such as PVC. In alternative embodiments, the mixing tube 101 can be manufactured from lightweight stainless steel, carbon fibre or the like.

An aspirating tube 116 penetrates the mixing tube 101 between the water inlet 106 and the aerated water outlet 108.

The aspirating tube 116 has an air outlet 120 introducing air into the mixing tube 101 and an air inlet 117 drawing air from atmosphere above a water surface above the submersible mixing tube 101.

The aerator 100 further comprises an outboard motor lower unit engagement 122 to engage a lower unit 105 of an outboard motor 102 such that the midsection 104 of the outboard motor 102 extends from the mixing tube 101 to the above surface power head 103.

The outboard motor lower unit engagement 122 preferably tightly and substantially watertight holds the lower unit 105 of the outboard motor 102. Furthermore, the mixing tube 101 may comprise a sufficient diameter such that the entire lower unit 105 including propeller 111 and skeg 110 is able to be accommodated within the mixing tube 101. In alternative embodiments, the mixing tube 101 has a lesser diameter and a slot to accommodate the skeg 110 therethrough. In either manner, however, the mixing tube 101 has sufficient diameter such that the propeller 111 can turn entirely within the mixing tube 101.

The air outlet 120 of the aspirating tube 116 is positioned between the aerated water outlet 108 and the outboard motor lower unit engagement 122 such that the propeller 111 of the outboard motor lower unit 105 thrusts water past the air outlet 120 to draw air therefrom, which mixes with the water to form a plume of aerated water thrust from the aerated water outlet 108.

Figure 2:
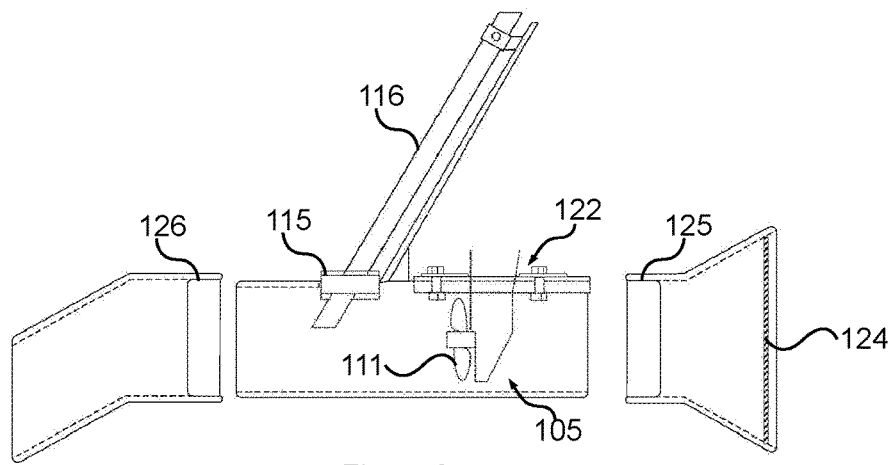
FIG. 2 shows a side elevation view of the aerator.

With reference to FIG. 2, the aspirating tube 116 may be angled at approximately 45° with respect to a longitudinal axis of the mixing tube 101 such that water flows past the air outlet 120 partially tangentially, thereby creating suction to draw air from the air inlet 117.

Figure 3:
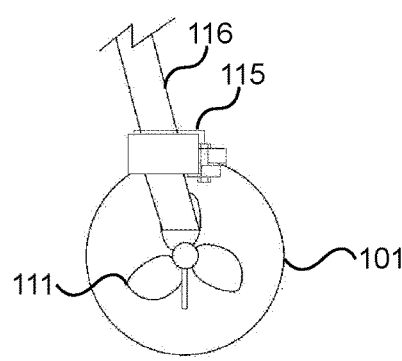
FIG. 3 shows an aerated water outlet end elevation view of the aerator.
Figure 4:
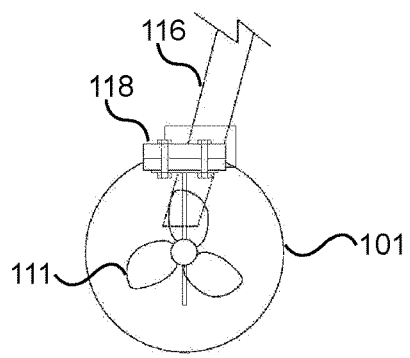
FIG. 4 shows a water inlet end elevation view of the aerator.

Furthermore, with reference to FIGS. 3 and 4, the aspirating tube 116 may be angled from a vertical axis to avoid the power head 103 of the outboard motor 102 therebehind.

In a preferred embodiment, the aspirating tube 116 is slidably retained within a sliding engagement 115 such that the insertion depth of the aspirating tube 116 within the mixing tube 101 may be optimised to find a position of maximum flow rate within water thrust by the propeller 111 which may vary according to outboard motor type.

In embodiments, the sliding engagement 115 may comprise a block with an angled aperture therein through which the aspirating tube 116 is slidably retained.

In embodiments, a support arm 114, which may be parallel with the aspirating tube 116, may hold a collar 121 supporting an upper portion of the aspirating tube 116.

The outboard motor lower unit engagement may comprise a channel 122 through which the lower unit 105 extends. Preferably, the channel 122 is sufficiently wide to accommodate different types of lower units 105 and different types of outboard motors 102.

In embodiments, the opposing edges of the channel 122 may be substantially sealed with longitudinal rubber gaskets 123, which close around the edges of the lower unit 105, thereby substantially reducing or eliminating water flow via the channel 122.

In a preferred embodiment, the channel 122 is elongate such that the position of the propeller 111 with respect to the air outlet 120 may be controlled. In this regard, it is generally desirous to position the air outlet 120 close to the propeller 111 to experience a higher flow rate and turbulence at this close position and to diminish the overall length of the mixing tube 101. However, the air outlet 120 should not be too close to induce cavitation at the propeller 111. As such, in accordance with this embodiment, in use, and in accordance with the specific type of outboard motor 102, the longitudinal position of the lower unit 105 may be controlled to optimise the position of the propeller 111 with respect to the air outlet 120.

In embodiments, the engagement 122 may comprise a fore bracket 118 and an aft bracket 113 which bear oppositely against fore and aft edges of the lower unit 105 so as to hold the lower unit 105 in position. In embodiments, each bracket 113, 118 may comprise top and bottom plates having fasteners extending therebetween through the channel 122 to clamp the plates against outer and inner surfaces of the mixing tube 101 and to hold the brackets 113, 118 in place.

In embodiments, the aerator 100 may comprise an inlet guide 109 of increasing diameter and a screen 124 at an entrance thereof. The inlet guide 109 may comprise a frustoconical section. The inlet guide cowl 109 allows the drawing in of water at the screen 124 at a lower flow rate than that within the mixing tube 101.

The inlet guide 109 may comprise a collar 125 which fits over the end of the mixing tube 101.

In a preferred embodiment, the channel 122 extends right to a rear edge 119 of the mixing tube 101 such that the lower unit 105 can be introduced into the mixing tube 101 from the rear open end thereof, and such that the channel 122 may be narrower than the diameter of the propeller 111. In this regard, for the installation of the lower unit 105, the inlet guide 109 may be removed and replaced once the lower unit 105 has been slid into place.

In embodiments, the aerator 100 may further comprise an angled outlet guide 107 which may direct the aerated water downwardly to increase aeration at greater depth. Similarly, the angled outlet guide 107 may comprise a collar 126 which may fit over the adjacent end of the mixing tube 101.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. An aerator comprising a submersible mixing tube having a water inlet and an aerated water outlet, an aspirating tube penetrating the mixing tube between the water inlet and the aerated water outlet, the aspirating tube having an air outlet introducing air into the mixing tube and an air inlet drawing in air from atmosphere above a water surface and wherein the mixing tube comprises an outboard motor lower unit engagement to engage a lower unit of an outboard motor in use such that a propeller of the outboard motor lower unit locates entirely within the mixing tube with a midsection of the outboard motor extending from the outboard motor lower unit engagement such that, in use, the propeller of the outboard motor lower unit thrusts water past the air outlet that is positioned downstream the propeller, thereby creating suction at the air inlet to draw air via the aspirating tube into the mixing tube to mix with the water and expel aerated water from the aerated water outlet, and an inlet cowl of increasing diameter with respect to the diameter of the mixing tube.

2. The aerator as claimed in claim 1, wherein the air outlet is located between the outboard motor lower unit engagement and the aerated water outlet.

3. The aerator as claimed in claim 2, wherein the aspirating tube is angled with respect to an elongate axis of the mixing tube.

4. The aerator as claimed in claim 3, wherein the aspirating tube is angled at approximately 45° with respect to the elongate axis.

5. The aerator as claimed in claim 1, wherein the aspirating tube is angled to one side of the mixing tube.

6. The aerator as claimed in claim 1, wherein the aspirating tube is slidably engaged within a sliding engagement such that the position of the air outlet thereof can be adjusted with respect to the mixing tube.

7. The aerator as claimed in claim 6, wherein the sliding engagement comprises a block within aperture therein through which the aspirating tube is slidably retained.

8. The aerator as claimed in claim 3, further comprising a support arm supporting an upper end of the aspirating tube.

9. The aerator as claimed in claim 8, wherein the support arm is parallel with the aspirating tube and holds a collar at the upper end of the aspirating tube within which the aspirating tube is slidably retained.

10. The aerator as claimed in claim 1, wherein the outboard motor lower unit engagement is configured such that, in use, a longitudinal position of the outboard motor lower unit with respect to the mixing tube can be adjusted.

11. The aerator as claimed in claim 10, wherein the outboard motor lower unit engagement comprises a longitudinal channel within which the outboard motor lower unit can be positioned at differing locations therealong.

12. The aerator as claimed in claim 11, further comprising fore and aft fixing brackets which engage fore and aft edges of the outboard motor lower unit at a position along the longitudinal channel.

13. The aerator as claimed in claim 11, wherein the longitudinal channel extends through an end of the mixing tube.

14. The aerator as claimed in claim 11, further comprising opposing longitudinal gaskets along the longitudinal channel which close against adjacent edges of the outboard motor lower unit in use.

15. The aerator as claimed in claim 1, wherein the inlet cowl comprises a frustoconical section.

16. The aerator as claimed in claim 15, wherein the inlet cowl comprises a screen at an entrance thereof.

17. The aerator as claimed in claim 1, wherein the inlet cowl comprises an engagement collar for fixing to an adjacent end of the mixing tube.

18. The aerator as claimed in claim 1, further comprising an angled outlet guide at the aerated water outlet.

19. The aerator as claimed in claim 18, wherein the angled outlet guide comprises an engagement collar for fixing to an adjacent end of the mixing tube.

20. A method of aeration by using an aerator, the aerator comprising a submersible mixing tube having a water inlet and an aerated water outlet, an inlet cowl of increasing diameter with respect to the diameter of the mixing tube coupled to the water inlet, and an aspirating tube penetrating the mixing tube between the water inlet and the aerated water outlet, the aspirating tube having an air outlet introducing air into the mixing tube and an air inlet drawing in air from atmosphere above a water surface and wherein the mixing tube comprises an outboard motor lower unit engagement to engage a lower unit of an outboard motor in use such that a propeller of the outboard motor lower unit locates entirely within the mixing tube with a midsection of the outboard motor extending from the outboard motor lower unit engagement such that, in use, the propeller of the outboard motor lower unit thrusts water past the air outlet thereby creating suction at the air inlet to draw air via the aspirating tube into the mixing tube to mix with the water and expel aerated water from the aerated water outlet, the method comprising inserting an outboard motor lower unit into the mixing tube such that the propeller thereof locates within the mixing tube such that the air outlet is positioned downstream of the propeller, the propeller powering the outboard motor to thrust water past the air inlet of the aspirating tube to aerate water.

21. The method of aeration as claimed in claim 20, wherein the aspirating tube is slidably engaged within a sliding engagement such that the position of the air outlet thereof can be adjusted with respect to the mixing tube, wherein the method further comprises sliding the aspirating tube within the sliding engagement to optimise the position of the air outlet.

22. The method of aeration as claimed in claim 21, wherein the outboard motor lower unit engagement is configured such that, in use, a longitudinal position of the outboard motor lower unit with respect to the mixing tube can be adjusted, wherein the method further comprises sliding the outboard motor lower unit within the sliding engagement to optimise the position of the outboard motor lower unit.

23. The method of aeration as claimed in claim 22, wherein optimising the position of the outboard motor lower unit comprises positioning the outboard motor lower unit away from the air outlet to reduce or eliminate cavitation.

24. The method of aeration as claimed in claim 22, wherein the aerator further comprises fore and aft fixing brackets which engage fore and aft edges of the outboard motor lower unit at a position along the longitudinal channel, wherein the longitudinal channel extends through an end of the mixing tube, and wherein inserting the outboard motor lower unit comprises sliding the lower unit via the edge of the mixing tube into the channel.

\* \* \* \* \*